(12) United States Patent
Chen et al.

(10) Patent No.: US 8,503,107 B2
(45) Date of Patent: Aug. 6, 2013

(54) OPTICAL LENS SYSTEM FOR TAKING IMAGE

(75) Inventors: Chun-Shan Chen, Taichung (TW); Tsung-Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 450 days.

(21) Appl. No.: 12/580,798

(22) Filed: Oct. 16, 2009

(65) Prior Publication Data

US 2010/0284094 A1 Nov. 11, 2010

(30) Foreign Application Priority Data

May 11, 2009 (TW) ................................ 98115571 A

(51) Int. Cl.
*G02B 9/36* (2006.01)
*G02B 13/00* (2006.01)

(52) U.S. Cl.
CPC ................ *G02B 9/36* (2013.01); *G02B 13/004* (2013.01)
USPC .......................................... 359/715; 359/775

(58) Field of Classification Search
CPC ..... G02B 9/36; G02B 9/38; G02B 9/40; G02B 9/42; G02B 9/44; G02B 9/56; G02B 13/004
USPC ........................... 359/715, 775, 771–772, 786
See application file for complete search history.

(56) References Cited

U.S. PATENT DOCUMENTS

| 5,139,342 | A * | 8/1992 | Matsuzaki | 359/708 |
| 7,777,973 | B2 * | 8/2010 | Jeong et al. | 359/775 |
| 7,869,142 | B2 * | 1/2011 | Chen et al. | 359/775 |
| 2008/0174885 | A1 * | 7/2008 | Choi et al. | 359/716 |
| 2010/0046095 | A1 * | 2/2010 | Nakagawa | 359/775 |

* cited by examiner

*Primary Examiner* — Zachary Wilkes
(74) *Attorney, Agent, or Firm* — Bang Shia

(57) ABSTRACT

An optical lens system for taking image comprises, in order from the object side to the image side: a first lens element with positive refractive power having a convex object-side surface; a second lens element with negative refractive power having a concave image-side surface and an object-side surface cemented to an image-side surface of the first lens element; a third lens element with negative refractive power; a fourth lens element with positive refractive power having a concave image-side surface and at least one inflection point; and an aperture stop located between an object to be photographed and the third lens element. In the optical lens system for taking image, the number of the lens elements with refractive power being limited to four. A focal length of the optical lens system for taking image is f, a focal length of the first lens element is f1, they satisfy the relation:

$0.8 < f/f1 < 2.1$.

2 Claims, 4 Drawing Sheets

OPTICAL LENS SYSTEM FOR TAKING IMAGE

BACKGROUND OF THE INVENTION

1. Field of the Invention

The present invention relates to an optical lens system for taking image, and more particularly to a miniaturized optical lens system for taking image used in a mobile phone camera.

2. Description of the Prior Art

In recent years, with the popularity of the mobile phone camera, the optical lens system for taking image has become thinner and thinner, and the electronic imaging sensor of a general digital camera is typically a CCD (Charge Coupled Device) or CMOS (Complementary Metal Oxide Semiconductor) sensor. Due to advances in semiconductor manufacturing, the pixel size of sensors has been reduced continuously, and miniaturized optical lens systems for taking image have increasingly higher resolution.

A conventional mobile phone camera usually consists of three lens elements: from the object side to the image side: a first lens element with positive refractive power, a second lens element with negative refractive power and a third lens element with positive refractive power, thus forming the so-called type of Triplet, such as the optical lens system for taking image described in U.S. Pat. No. 7,145,736. As the pixel size of electronic imaging sensors gradually becomes smaller and smaller, the system requires higher image quality. The conventional optical lens system comprising three lens elements cannot satisfy the requirements of higher resolution optical lens systems.

The present invention mitigates and/or obviates the aforementioned disadvantages.

SUMMARY OF THE INVENTION

The primary objective of the present invention is to provide an optical lens system for taking image comprising four lens elements to improve image quality, effectively control the total track length of the optical lens system and maintain the objective of miniaturization of the optical lens system.

An optical lens system for taking image in accordance with the present invention comprises: in order from the object side to the image side: a first lens element with positive refractive power having a convex object-side surface; a second lens element with negative refractive power having a concave image-side surface and an object-side surface cemented to an image-side surface of the first lens element; a third lens element with negative refractive power; a fourth lens element having a concave image-side surface; and an aperture stop being located between an object to be photographed and the third lens element. In the optical lens system for taking image, the number of the lens elements with refractive power being limited to four. Such lens arrangements can effectively improve image quality of the system and maintain the objective of miniaturization of the optical lens system.

In the present optical lens system for taking image, the refractive power of the system is mainly provided by the first lens element with positive refractive power. The second lens element with negative refractive power mainly serves to correct the chromatic aberration. In addition, the first lens element with positive refractive power and the second lens element with negative refractive power can be cemented to each other, so that the chromatic aberration can be effectively corrected. The third lens element and the fourth lens element serve as correction lens elements to balance and correct various aberrations caused by the optical lens system. If the third lens element and the fourth lens element are both negative, the principal point of the system will be far away from the image plane, so that it will be favorable to reduce the total track length of the optical lens system. In addition, if alternating the third lens element and the fourth lens element with negative and positive refractive powers, the coma of the system can be corrected, and excessive increase of other aberrations can be prevented.

The positive refractive power is mainly provided by the first lens element, and the aperture stop is located close to the object side, so that the total track length of the optical lens system can be effectively reduced, and the exit pupil of the optical lens system will be far away from the image plane. Therefore, the light will be projected onto the sensor with a relatively small incident angle, this is the telecentric feature of the image side, and this feature is very important to the photosensitive power of current solid-state sensors, since they are more sensitive when the light is incident at a small angle. This also reduces the probability of the occurrence of shading. In the present optical system for taking image, at least one inflection point formed on the fourth lens element will contribute to a better correction of the incident angle of the off axis light with respect to the sensor.

In addition, in wide angle optical systems, it is especially necessary to correct the distortion and the chromatic aberration of magnification, and this can be solved by locating the aperture stop at the balance point of the refractive power of the system. In the present optical lens system for taking image, if the aperture stop is located in front of the first lens element, the telecentric feature of the optical lens system is emphasized, and the total track length of the optical lens system will become shorter. If the aperture stop is located between the second and third lens elements, the wide field of view is emphasized, and the optical system is less sensitive as well.

In the present optical lens system for taking image, the lens elements can be made of glass or plastic. If the lens elements are made of glass, there is more freedom in distributing the refractive power of the optical lens system. In addition, glass material is more resistant to environmental change, resulting in more stable image quality of the optical lens system. If plastic material is introduced to make lens elements by injection molding, the cost will be effectively reduced.

In the present optical lens system for taking image, the lens elements can be provided with aspheric surfaces, allowing more design parameter freedom (than spherical surfaces), so as to better reduce aberrations and the number of the lens elements, thus effectively reducing the total track length of the optical lens system.

According to one aspect of the present invention, in the present optical lens system for taking image, the focal length of the optical lens system for taking image is f, the focal length of the first lens element is f1, and they satisfy the relation:

$$0.8 < f/f1 < 2.1.$$

If f/f1 satisfies the above relation, the refractive power of the first lens element is more balanced, thus allowing effective control of the total track length of the optical lens system, so as to maintain the objective of miniaturization of the optical lens system for taking image. Also, the high order aberrations of the system can be more favorably corrected, improving the image quality of the optical lens system.

According to another aspect of the present invention, in the present optical lens system for taking image, the focal length of the optical lens system for taking image is f, the focal length of the first lens element and the second lens element combined is f12, and they satisfy the relation:

$$0.6 < f/f12 < 1.3.$$

If f/f12 satisfies the above relation, the first lens element with positive refractive power and the second lens element with negative refractive power which are cemented together can more favorably correct the chromatic aberration of the optical lens system, and a balance can be obtained between the correction of aberrations and the reduction of the total track length. In addition, if the first and second lens elements are made of glass lenses cemented together, it will be more resistant to environmental changes, resulting in more stable image quality of the optical lens system. Further, it will be better if f/f12 satisfies the relation:

$$0.9 < f/f12 < 1.1.$$

According to another aspect of the present invention, in the present optical lens system for taking image, the focal length of the optical lens system for taking image is f, the focal length of the third lens element is f3, and they satisfy the relation:

$$0 < |f/f3| < 0.2.$$

If f/f3 satisfies the above relation, the third lens element serves as a correction lens element to balance and correct various aberrations caused by the optical lens system, and the astigmatism and the distortion caused by the optical lens system can be more favorably corrected, improving the resolution of the optical lens system.

According to another aspect of the present invention, in the present optical lens system for taking image, the focal length of the optical lens system for taking image is f, the focal length of the fourth lens element is f4, and they satisfy the relation:

$$0 < |f/f4| < 0.4.$$

If f/f4 satisfies the above relation, the fourth lens element serves as a correction lens element, and the aberrations of the system can be more favorably corrected, improving the image quality of the optical lens system. Further, it will be better if f/f4 satisfies the relation:

$$0 < |f/f4| < 0.2.$$

According to another aspect of the present invention, in the present optical lens system for taking image, the focal length of the optical lens system for taking image is f, the on-axis distance between the third lens element and the fourth lens element is T34, and they satisfy the relation:

$$0.05 < T34/f < 0.20.$$

If T34/f satisfies the above relation, the high order aberration of the system can be more favorably corrected.

According to another aspect of the present invention, in the present optical lens system for taking image, the Abbe number of the first lens element is V1, the Abbe number of the second lens element is V2, and they satisfy the relation:

$$25 < V1 - V2 < 40.$$

If V1−V2 satisfies the above relation, the chromatic aberration caused by the optical lens system can be more favorably corrected.

According to another aspect of the present invention, in the present optical lens system for taking image, an object to be photographed is imaged on an electronic imaging sensor, the total track length of the optical lens system for taking image is TTL, which is defined as the distance from the object-side surface of the first lens element to the image plane along the optical axis, the maximum image height of the optical lens system for taking image is ImgH, which is defined as half of the length of the diagonal of the electronic imaging sensor's effective pixel region, and they satisfy the relation:

$$TTL/ImgH < 2.15.$$

The above relation can maintain the objective of miniaturization of the optical lens system for taking image.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1A:
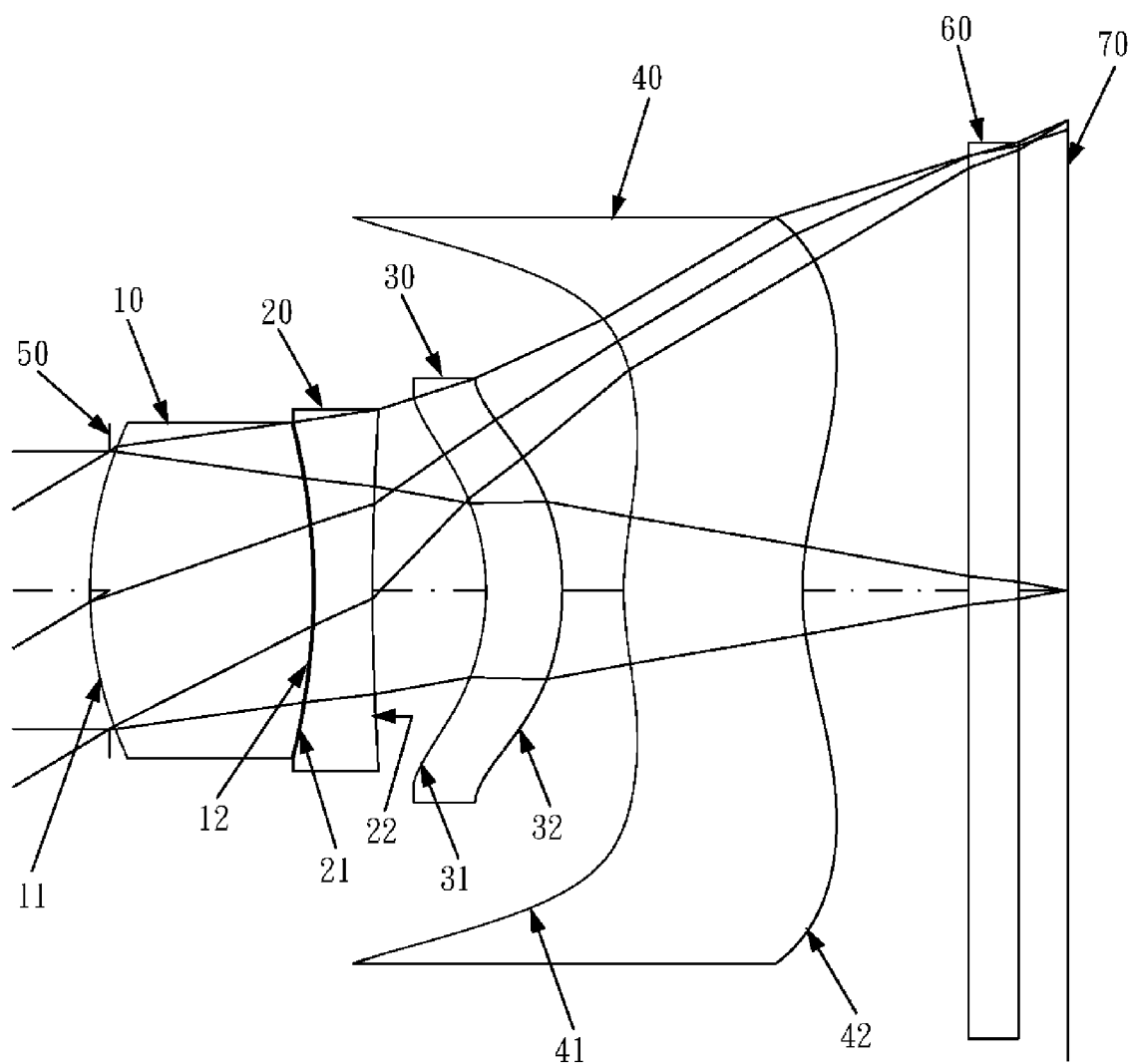
FIG. 1A shows an optical lens system for taking image in accordance with a first embodiment of the present invention.
Figure 1B:
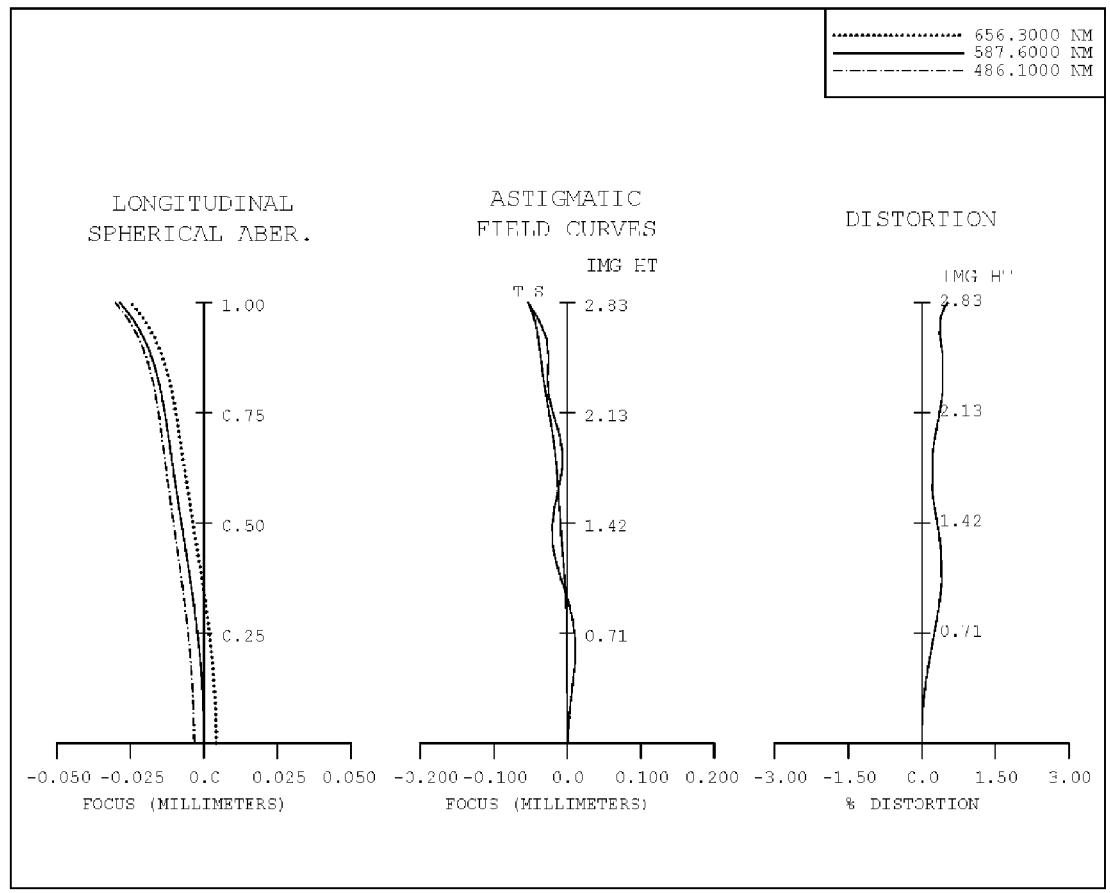
FIG. 1B shows the aberration curves of the first embodiment of the present invention.

Referring to FIG. 1A, which shows an optical lens system for taking image in accordance with a first embodiment of the present invention, and FIG. 1B shows the aberration curves of the first embodiment of the present invention. An optical lens system for taking image in accordance with the first embodiment of the present invention comprises: in order from the object side to the image side:

A glass first lens element 10 with positive refractive power has a convex object-side surface 11 and a convex image-side surface 12.

A glass second lens element 20 with negative refractive power has a concave object-side surface 21 and a concave image-side surface 22, and the object-side surface 21 of the second lens element 20 is cemented to the image-side surface 12 of the first lens element 10.

A plastic third lens element 30 with negative refractive power has a concave object-side surface 31 and a convex image-side surface 32, and the object-side surface 31 and the image-side surface 32 of the third lens element 30 are aspheric.

A plastic fourth lens element 40 with positive refractive power has a convex object-side surface 41 and a concave image-side surface 42, the object-side surface 41 and the image-side surface 42 of the fourth lens element 40 are aspheric, and inflection points are formed on the object-side surface 41 and the image-side surface 42 of the fourth lens element 40.

An aperture stop 50 is located between an object to be photographed and the first lens element 10.

An IR cut filter 60 is located behind the fourth lens element 40 and has no influence on the focal length of the optical lens system.

An image plane 70 is located behind the IR cut filter 60.

The equation for the aspheric surface profiles of the first embodiment is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric lens surface at a distance Y from the optical axis relative to the tangential plane at the aspheric surface vertex;

Y: the distance from the point on the curve of the aspheric surface to the optical axis;

k: the conic coefficient;

Ai: the aspheric surface coefficient of order i.

In the first embodiment of the present optical lens system for taking image, the focal length of the optical lens system for taking image is f, the focal length of the first lens element is f1, the focal length of the first lens element and the second lens element combined is f12, the focal length of the third lens element is f3, the focal length of the fourth lens element is f4, and they satisfy the relations:

$f=4.70$ mm;

$f/f1=1.78$;

$f/f12=0.95$;

$|f/f3|=0.10$;

$|f/f4|=0.05$.

In the first embodiment of the present optical lens system for taking image, the Abbe number of the first lens element is V1, the Abbe number of the second lens element is V2, and they satisfy the relation:

$V1-V2=32.8$.

In the first embodiment of the present optical lens system for taking image, the focal length of the optical lens system for taking image is f, the on-axis distance between the third lens element and the fourth lens element is T34, and they satisfy the relation:

$T34/f=0.08$.

In the first embodiment of the present optical lens system for taking image, an object to be photographed is imaged on an electronic imaging sensor, the total track length of the optical lens system for taking image is TTL, the maximum image height of the optical lens system for taking image is ImgH, and they satisfy the relation:

$TTL/ImgH=2.08$.

The detailed optical data of the first emobdiment is shown in table 1, and the aspheric surface data is shown in table 2, wherein the units of the radius of curvature, the thickness and the focal length are expressed in mm, and HFOV is half of the maximal field of view.

TABLE 1

(Embodiment 1)
f(focal length) = 4.70 mm, Fno = 2.8, HFOV (half of field of view) = 31.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.115 | | | | |
| 2 | Lens 1 | 2.38100 | 1.340 | Glass | 1.620 | 60.3 | 2.64 |
| 3 | | −4.09630 | 0.010 | Cement | | | |
| 4 | Lens 2 | −4.08590 | 0.350 | Glass | 1.755 | 27.5 | −4.31 |
| 5 | | 16.54170 | 0.682 | | | | |
| 6 | Lens 3 | −1.49020(ASP) | 0.459 | Plastic | 1.544 | 55.9 | −48.42 |
| 7 | | −1.75099(ASP) | 0.371 | | | | |
| 8 | Lens 4 | 2.02859(ASP) | 1.073 | Plastic | 1.544 | 55.9 | 96.02 |
| 9 | | 1.71714(ASP) | 1.000 | | | | |
| 10 | IR-filter | Plano | 0.300 | Glass | 1.517 | 64.2 | |
| 11 | | Plano | 0.298 | | | | |
| 12 | Image | Plano | | | | | |

TABLE 2

Aspheric Coefficients

| Surface # | 6 | 7 | 8 | 9 |
|---|---|---|---|---|
| k = | −3.92007E−01 | 1.86400E−01 | −8.75113E+00 | −4.79080E+00 |
| A4 = | 6.46101E−03 | −1.55466E−01 | −1.51858E−01 | −8.02035E−02 |
| A6 = | −1.76921E−01 | 1.05600E−01 | 5.25948E−02 | 2.19041E−02 |
| A8 = | 2.35715E−01 | −4.94953E−02 | −2.50754E−03 | −3.69414E−03 |
| A10 = | −6.47792E−02 | 5.17115E−02 | −3.45672E−03 | 2.31689E−04 |
| A12 = | | −1.25433E−02 | 4.74671E−04 | −3.07399E−06 |
| A14 = | | | | 3.01992E−07 |
| A16 = | | | | −1.22359E−07 |

Figure 2A:
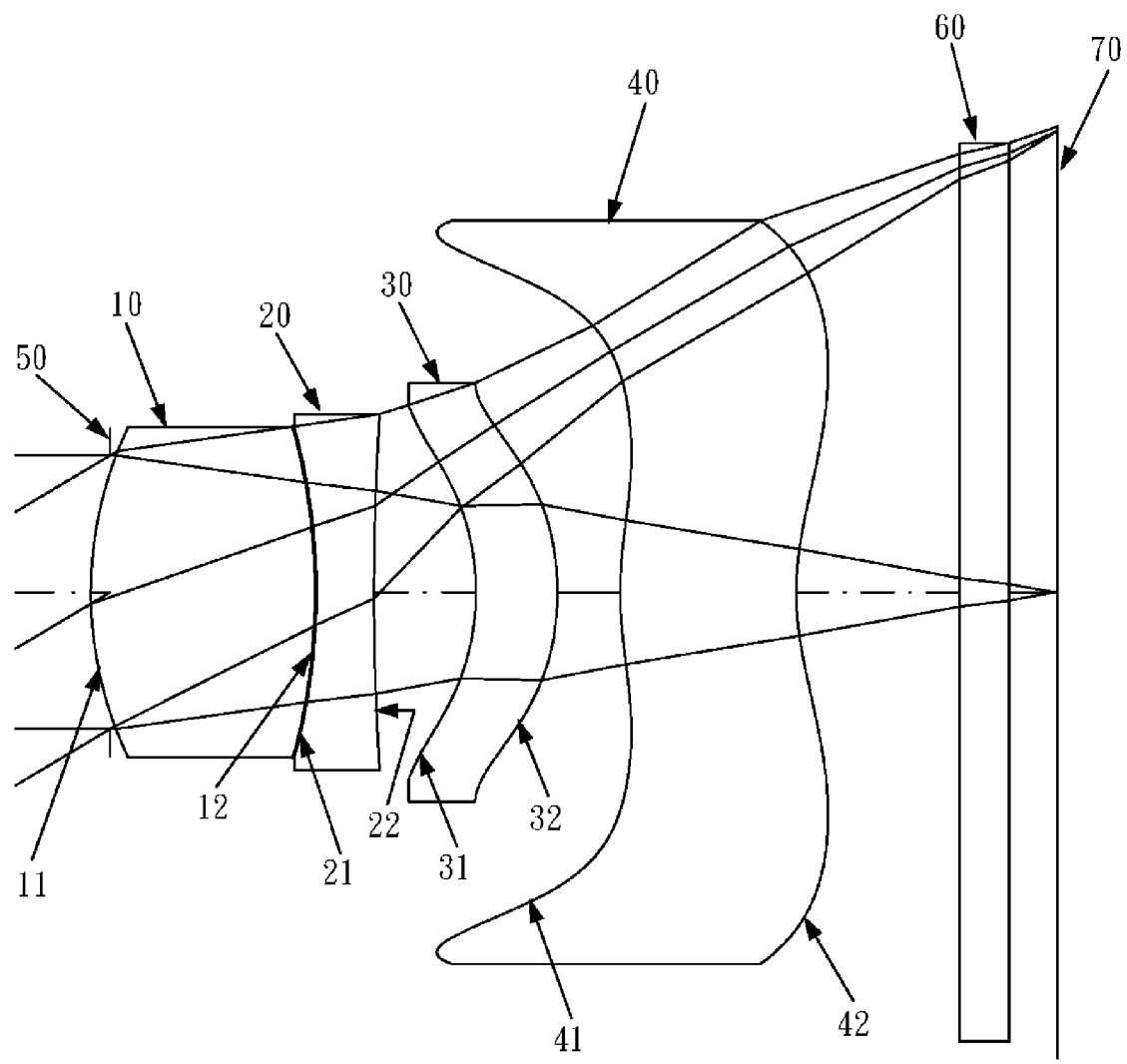
FIG. 2A shows an optical lens system for taking image in accordance with a second embodiment of the present invention.
Figure 2B:
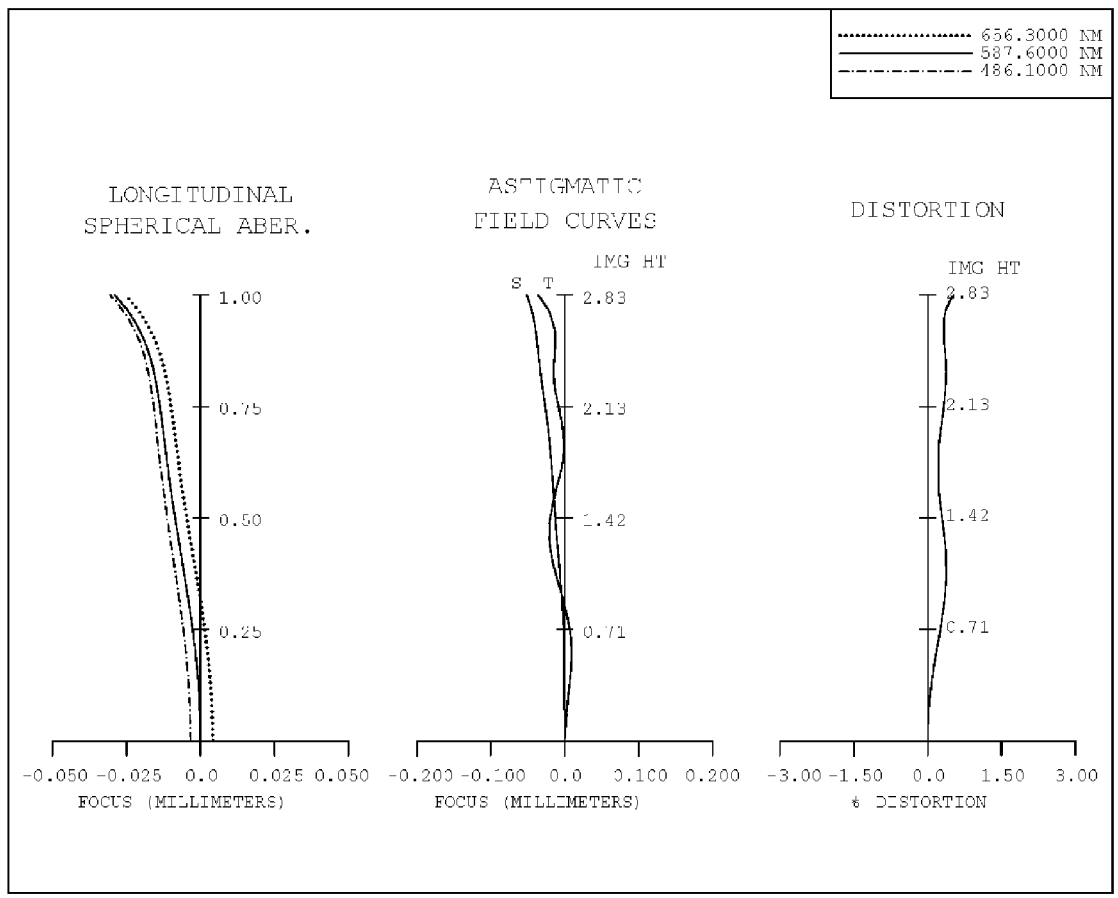
FIG. 2B shows the aberration curves of the second embodiment of the present invention.

Referring to FIG. 2A, which shows an optical lens system for taking image in accordance with a second embodiment of the present invention, and FIG. 2B shows the aberration curves of the second embodiment of the present invention. The second embodiment of the present invention comprises: in order from the object side to the image side:

A glass first lens element 10 with positive refractive power has a convex object-side surface 11 and a convex image-side surface 12.

A glass second lens element 20 with negative refractive power has a concave object-side surface 21 and a concave image-side surface 22, and the object-side surface 21 of the second lens element 20 is cemented to the image-side surface 12 of the first lens element 10.

A plastic third lens element 30 with negative refractive power has a concave object-side surface 31 and a convex image-side surface 32, and the object-side surface 31 and the image-side surface 32 of the third lens element 30 are aspheric.

A plastic fourth lens element 40 with negative refractive power has a convex object-side surface 41 and a concave image-side surface 42, the object-side surface 41 and the image-side surface 42 of the fourth lens element 40 are aspheric, and inflection points are formed on the object-side surface 41 and the image-side surface 42 of the fourth lens element 40.

An aperture stop 50 is located between an object to be photographed and the first lens element 10.

An IR cut filter 60 is located behind the fourth lens element 40 and has no influence on the focal length of the optical lens system.

An image plane 70 is located behind the IR cut filter 60.

The equation for the aspheric surface profiles of the second embodiment has the same form as that of the first embodiment.

In the second embodiment of the present optical lens system for taking image, the focal length of the optical lens system for taking image is f, the focal length of the first lens element is f1, the focal length of the first lens element and the second lens element combined is f12, the focal length of the third lens element is f3, the focal length of the fourth lens element is f4, and they satisfy the relations:

$f=4.72$ mm;

$f/f1=1.82$;

$f/f12=0.97$;

$|f/f3|=0.05$;

$|f/f4|=0.03$.

In the second embodiment of the present optical lens system for taking image, the Abbe number of the first lens element is V1, the Abbe number of the second lens element is V2, and they satisfy the relation:

$V1-V2=32.5$.

In the second embodiment of the present optical lens system for taking image, the focal length of the optical lens system for taking image is f, the on-axis distance between the third lens element and the fourth lens element is T34, and they satisfy the relation:

$T34/f=0.08$.

In the second embodiment of the present optical lens system for taking image, an object to be photographed is imaged on an electronic imaging sensor, the total track length of the optical lens system for taking image is TTL, the maximum image height of the optical lens system for taking image is ImgH, and they satisfy the relation:

$TTL/\text{ImgH}=2.08$.

The detailed optical data of the second embodiment is shown in table 3, and the aspheric surface data is shown in table 4, wherein the units of the radius of curvature, the thickness and the focal length are expressed in mm, and HFOV is half of the maximal field of view.

TABLE 3

(Embodiment 2)
f(focal length) = 4.72 mm, Fno = 2.8, HFOV (half of field of view) = 31.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.117 | | | | |
| 2 | Lens 1 | 2.38100 | 1.370 | Glass | 1.620 | 60.3 | 2.59 |
| 3 | | −3.84450 | 0.010 | Cement | | | |
| 4 | Lens 2 | −3.83560 | 0.350 | Glass | 1.741 | 27.8 | −4.20 |
| 5 | | 17.19510 | 0.624 | | | | |
| 6 | Lens 3 | −1.54429(ASP) | 0.497 | Plastic | 1.544 | 55.9 | −93.32 |
| 7 | | −1.77336(ASP) | 0.384 | | | | |
| 8 | Lens 4 | 2.20109(ASP) | 1.076 | Plastic | 1.544 | 55.9 | −147.27 |
| 9 | | 1.77321(ASP) | 1.000 | | | | |
| 10 | IR-filter | Plano | 0.300 | Glass | 1.517 | 64.2 | |
| 11 | | Plano | 0.298 | | | | |
| 12 | Image | Plano | | | | | |

TABLE 4

Aspheric Coefficients

| Surface # | 6 | 7 | 8 | 9 |
|---|---|---|---|---|
| k = | −2.22396E−01 | −6.51091E−03 | −1.05586E+01 | −5.39009E+00 |
| A4 = | 7.24268E−03 | −1.51870E−01 | −1.51175E−01 | −7.58139E−02 |
| A6 = | −1.58839E−01 | 1.08066E−01 | 5.26239E−02 | 2.01776E−02 |
| A8 = | 2.35560E−01 | −5.10048E−02 | −2.39665E−03 | −3.16690E−03 |
| A10 = | −7.12265E−02 | 4.95516E−02 | −3.85887E−03 | 6.48561E−05 |
| A12 = | | −1.25790E−02 | 5.83625E−04 | 3.25224E−05 |
| A14 = | | | | −3.49310E−06 |
| A16 = | | | | 4.50956E−08 |

TABLE 5

|  | Embodiment 1 | Embodiment 2 |
|---|---|---|
| f | 4.70 | 4.72 |
| Fno | 2.8 | 2.8 |
| HFOV | 31.1 | 31.0 |
| V1-V2 | 32.8 | 32.5 |
| T34/f | 0.08 | 0.08 |
| f/f1 | 1.78 | 1.82 |
| f/f12 | 0.95 | 0.97 |
| \|f/f3\| | 0.10 | 0.05 |
| \|f/f4\| | 0.05 | 0.03 |
| TTL/ImgH | 2.08 | 2.08 |

It is to be noted that the tables 1-4 show different data from the different embodiments, however, the data of the different embodiments is obtained from experiments. Therefore, any product of the same structure is deemed to be within the scope of the present invention even if it uses different data. Table 5 lists the relevant data for the various embodiments of the present invention.

While we have shown and described various embodiments in accordance with the present invention, it should be clear to those skilled in the art that further embodiments may be made without departing from the scope of the present invention.

What is claimed is:

1. An optical lens system for taking image comprising, in order from the object side to the image side:

a first lens element with positive refractive power having a convex object-side surface;

a second lens element with negative refractive power having a concave image-side surface, and an object-side surface of the second lens element being cemented to an image-side surface of the first lens element;

a third plastic lens element with negative refractive power having a concave object-side surface and a convex image-side surface, at least one of the object-side and the image-side surfaces of the third lens element being aspheric;

a fourth plastic lens element with positive refractive power having a concave image-side surface, at least one of an object-side surface and the image-side surface of the fourth lens element being formed with at least one inflection point; and an aperture stop being located before the first lens element; in the optical lens system for taking image, the number of the lens elements with refractive power being limited to four; a focal length of the optical lens system for taking image being f, a focal length of the first lens element being f1, a focal length of the fourth lens element being f4, a focal length of the first lens element and the second lens element combined being f12, an Abbe number of the first lens element being V1, an Abbe number of the second lens element being V2, they satisfy the relation:

$0.8 < f/f1 < 2.1;$ $0.6 < f/f12 < 1.3;$ $0 < |f/f4| < 0.4;$ $30 < V1-V2 < 40.$

2. The optical lens system for taking image as claimed in claim 1, wherein the focal length of the optical lens system for taking image is f, the focal length of the first lens element and the second lens element combined is f12, they satisfy the relation:

$0.9 < f/f12 < 1.1;$ the focal length of the optical lens system for taking image is f, a focal length of the third lens element is f3, they satisfy the relation:

$0 < |f/f3| < 0.2;$ the focal length of the optical lens system for taking image is f, the focal length of the fourth lens element is f4, and they satisfy the relation:

$0 < |f/f4| < 0.2.$

* * * * *